US005132727A

United States Patent [19]

Benker

[11] Patent Number: 5,132,727

[45] Date of Patent: Jul. 21, 1992

[54] METHOD OF AND ARRANGEMENT FOR MONITORING PHOTOGRAPHIC COPYING APPARATUS

[75] Inventor: Gerhard Benker, Pullach, Fed. Rep. of Germany

[73] Assignee: Agfa-Gevaert Aktiengesellschaft, Leverkusen, Fed. Rep. of Germany

[21] Appl. No.: 759,893

[22] Filed: Sep. 13, 1991

[30] Foreign Application Priority Data

Oct. 2, 1990 [DE] Fed. Rep. of Germany ....... 4031110

[51] Int. Cl.[5] .............................................. G03B 27/00

[52] U.S. Cl. ..................................... 355/133; 355/201

[58] Field of Search ................................ 355/201, 133

[56] References Cited

U.S. PATENT DOCUMENTS 4,739,377 4/1988 Allen .................................. 355/133

4,980,719 12/1990 Allen et al. ......................... 355/201

*Primary Examiner*—Richard A. Wintercorn

*Attorney, Agent, or Firm*—Peter K. Kontler

[57] ABSTRACT

A copying apparatus has a receiving station, an exposure unit, a developing unit, an inspection station and a pricing unit with a memory. A master to be reproduced arrives at the receiving station together with an order for the reproduction thereof. The order has a coded order number which is read by a scanner at the receiving station and entered in the memory to establish a data set. The exposure unit is inoperative upon arrival of the master at the receiving station and is activated only upon entry of the order number. The master is then drawn into the exposure unit where copy material is exposed to light which has illuminated the master. The copy material is developed in the developing unit and the resulting copies are delivered to the inspection station where they are inspected for quality. The number of copies made is entered in the memory and incorporated in the data set with the order number. If, upon inspection, a copy is found to be unsatisfactory, the data set is adjusted by reading an appropriate code with a scanner. This code may be marked on the back of the copy or may be selected from a set of codes which represent respective price adjustments. Once the data set has been corrected, the pricing unit calculates and prints the final price of the order.

21 Claims, 2 Drawing Sheets

METHOD OF AND ARRANGEMENT FOR MONITORING PHOTOGRAPHIC COPYING APPARATUS

BACKGROUND OF THE INVENTION

The invention relates generally to the reproduction of masters or originals.

More particularly, the invention relates to the monitoring of photographic copying apparatus, especially copying apparatus having an exposure unit in combination with a developing unit.

Apparatus in which photographic copy paper is exposed to copy light from exposed and developed photographic film and is then developed and sorted have been known for some time. This has led to the establishment of businesses, and even chains, where photographers, primarily those for whom photography is a hobby, can deposit their developed films and obtain copies within a very short period of time, i.e., can wait while their order is processed.

Employees of such businesses or chains regularly process orders for themselves so that the apparatus are used without compensation. This can result in substantial losses for the owners of the businesses and apparatus.

SUMMARY OF THE INVENTION

It is an object of the invention to provide a method of monitoring a copying apparatus.

Another object of the invention is to provide a method which makes it possible to keep a true record of the orders processed, and the number of copies produced, by a copying apparatus.

An additional object of the invention is to provide an arrangement for monitoring a copying apparatus.

A further object of the invention is to provide an arrangement which enables an accurate record to be kept of the orders processed, and the number of copies produced, by a copying apparatus.

The preceding objects, as well as others which will become apparent as the description proceeds, are achieved by the invention.

One aspect of the invention resides in a copying method, particularly for use with photographic copying apparatus. The method comprises the steps of receiving a master together with an order for reproduction thereof; reading data characteristic of the order; processing the order only upon completion of the reading step; and storing the characteristic data so as to inhibit unauthorized access thereto. The processing step includes reproduction of the master.

The method of the invention makes it possible to monitor a copying apparatus and obtain a record of the orders processed by the same.

The operation of reproducing the master may comprise exposing copy material to copy light from the master, and developing the exposed copy material. A preferred apparatus for carrying out this operation is one having an exposure unit in combination with a developing unit.

The order will generally be accommodated in a bag or similar receptacle and the characteristic data for the order is then preferably present on the bag in the form of a bar code. The reading step here includes scanning the bar code on the bag.

The characteristic data preferably includes the order number when such a number has been assigned to the order.

The characteristic data establishes a data set and the method may further comprise the step of incorporating additional data relating to reproduction of the master in the data set. The additional data may, for instance, include the number of copies made of the master.

The step of storing the characteristic data may be performed at or near the beginning of the processing step, and the step of incorporating the additional data may be carried out at or near the end of the processing step.

The method may additionally comprise the steps of inspecting the copies made during reproduction of the master, and correcting the data set, i.e., the set containing the characteristic data and the additional data, when at least one of the copies is unsalable. The correcting step may involve reading of a bar code.

The method may also comprise the step of marking the copies with at least part of the characteristic data. It is preferred for the marking step to be carried out prior to inspection of the copies so as to simplify identification of the latter.

The method may further comprise the step of pricing the order. To this end, the copying apparatus being monitored may be connected to a pricing unit having a memory. Whenever processing of an order is initiated, a corresponding data set is established in the memory. As indicated previously, the data set may include data characteristic of the order, e.g., the order number, and additional data relating to reproduction of a master constituting part of the order. After inspection of the copies, the data set may be corrected by the operator should this be necessary. For example, if the data set includes the number of copies made during reproduction of the master and inspection of the copies shows that one or more copies are unsalable, the data set may be corrected to adjust for the unsalable copies. Thereafter, the data set can only be changed or erased by a special program which is protected against unauthorized access.

The pricing unit may be switchable between an operative or activated condition and an inoperative or deactivated condition. The step of storing the characteristic data, which may be performed prior to reproduction of the master as indicated previously, here involves entering the characteristic data in the pricing unit while the latter is activated. The method may then additionally comprise the steps of deactivating the pricing unit after the storing step and before reproduction of the master has been completed; and reactivating the pricing unit subsequent to reproduction of the master. The additional data relating to reproduction of the master may here be incorporated in the data set following reactivation of the pricing unit.

The deactivating step may take place after reproduction of the master has been initiated by reading of the characteristic data while the reactivating step may be performed at or near the time that processing of the order is being completed. The additional data stored after reactivation of the pricing unit may include the number of copies made during the interval between deactivation and reactivation of the pricing unit.

It is sometimes necessary to make relatively large numbers of test copies with the apparatus being monitored. In such an event, a special data set is established for the test copies and identified appropriately.

Another aspect of the invention resides in a copying apparatus, particularly a photographic copying apparatus. The apparatus comprises a station for receiving a master together with an order for reproduction thereof; means, e.g., a bar code scanner, at the receiving station for reading data characteristic of the order; means for reproducing the master; and means for storing the characteristic data so as to inhibit unauthorized access thereto. The reproducing means, which preferably includes an exposure unit in combination with a developing unit, is designed to be activated in response to the reading means.

The storing means may constitute part of a means for pricing the order. The pricing means may include means for calculating the price of the order, and means for printing the price.

The apparatus may further comprise an inspection station for inspecting the copies from the reproducing means, and means at the inspection station for entering corrections in the storing means. The entering means may include a bar code scanner.

By virtue of the invention, the reproduction procedure can no longer be initiated without a proper order. On the other hand, as soon as processing of a proper order is begun, the data relating to the order is reliably recorded. This data can not be erased without the consent of the owner or the responsible person. It is only upon final inspection of the copies that an operator can reduce the recorded number of copies. Advantageously, however, this is accomplished not by means of a keyboard but, rather, with a bar code scanning pencil so that even here manipulation is practically impossible. Similarly, the characteristic data for the order, e.g., the order number, can be read into the apparatus by the operator at the receiving station using a scanning pencil. To facilitate final inspection of the copies, each copy can be marked with at least part of the characteristic data read in at the receiving station. This allows a clear link between the copies and the respective order to be established.

The novel features which are considered as characteristic of the invention are set forth in particular in the appended claims. The improved copying method, as well as the construction and mode of operation of the improved copying apparatus, will, however, be best upon perusal of the following detailed description of certain specific embodiments when read in conjunction with the accompanying drawings.

DESCRIPTION OF THE PREFERRED EMBODIMENTS

Figure 1:
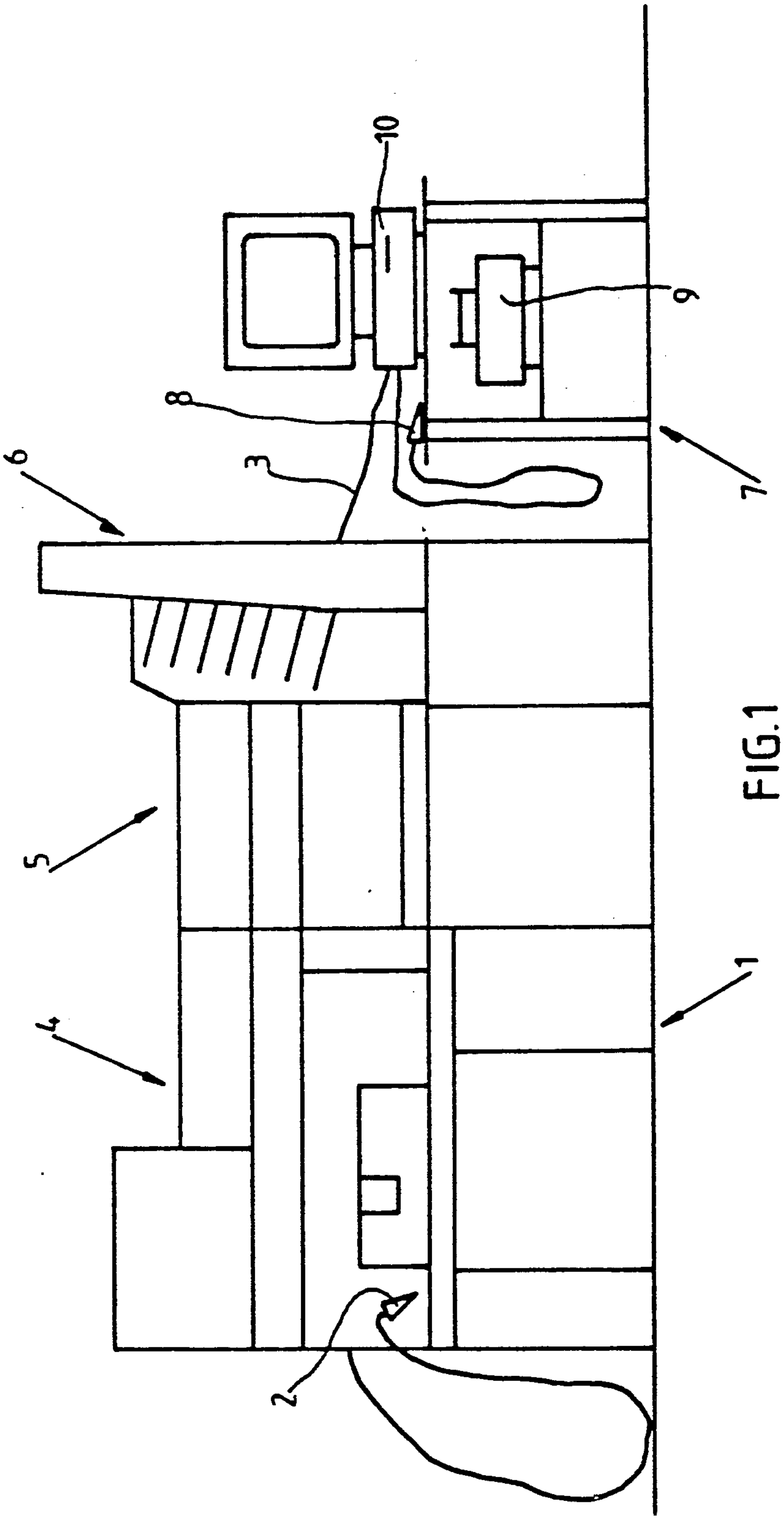
FIG. 1 schematically illustrates a copying apparatus in accordance with the invention.

FIG. 1 shows a copying apparatus according to the invention. The copying apparatus is assumed to be a photographic copying apparatus, that is, an apparatus for making copies of exposed and developed photographic film.

The copying apparatus, which is here a combined exposure and developing apparatus, includes an exposure unit or copier 4 and a developing unit 5. In the exposure unit 4, photographic copy paper is exposed to copy light which has illuminated a master or original to be reproduced. The exposed copy paper is developed in the developing unit 5.

Figure 2:
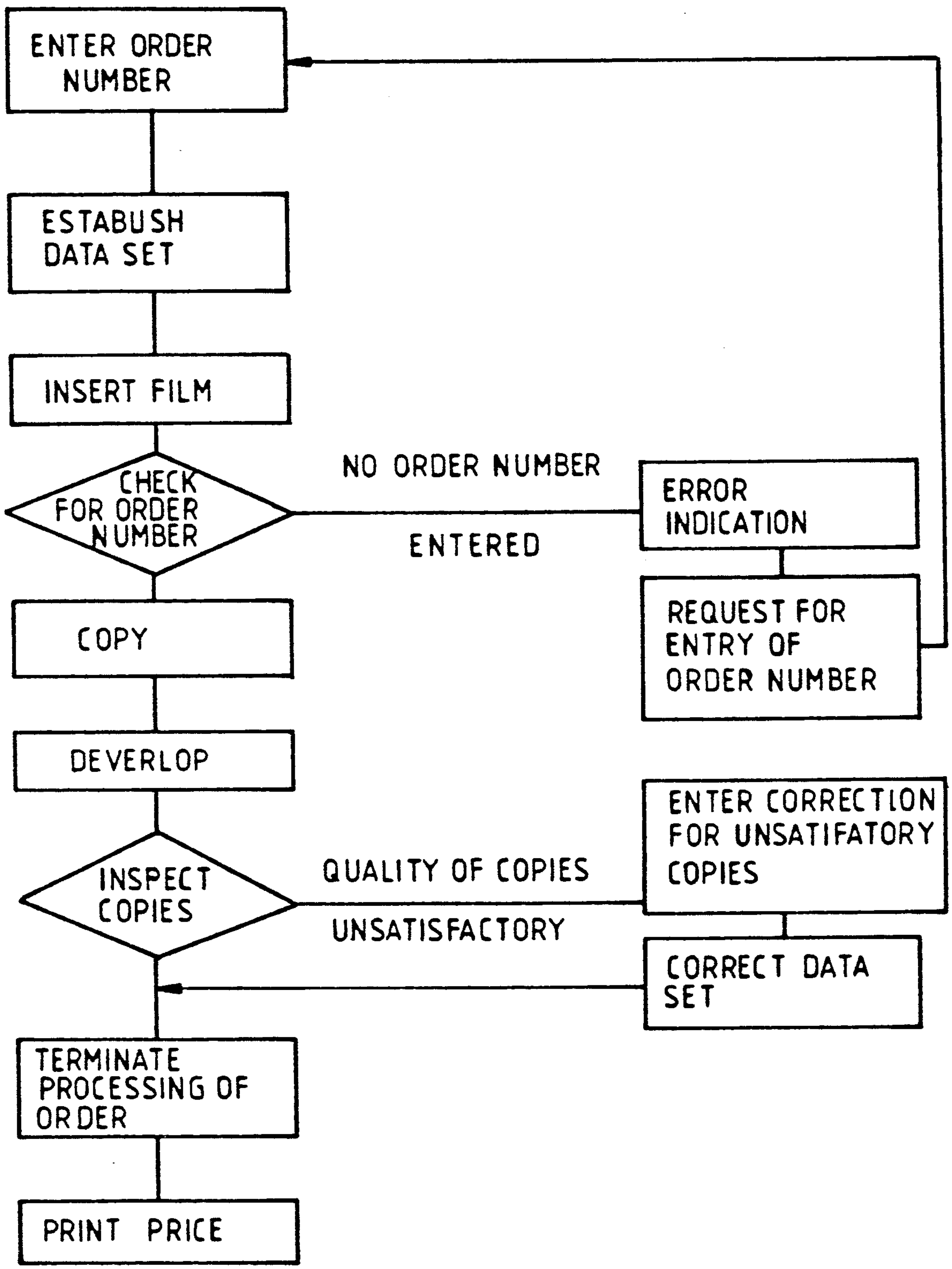
FIG. 2 is a flow diagram of a copying method according to the invention.

The operation of the copying apparatus, which is illustrated in the flow diagram of FIG. 2, is as follows:

The copying apparatus has a receiving station 1 for a master to be reproduced and an associated order for reproduction of the master. The master is here assumed to be an exposed and develop photographic film. The order arrives at the receiving station 1 in a bag or similar receptacle which is marked with an order number. The order number, which is preferably in the form of a bar code, is scanned by a scanning pencil 2 located at the receiving station 1 and is then read into the apparatus. The order number represents data characteristic of the order.

A conductor 3 connects the exposure unit 4 and developing unit 5 with a memory 10 of a pricing unit. The pricing unit functions to calculate the price of the order and to print the price. The order number read by the scanning pencil 2 is entered in the memory 10 where a data set, which includes the order number, is established for the order.

The exposure unit 4 has a support or stage for masters to be reproduced and the operator now places the film at the receiving station 1 on the support. At this time, the apparatus checks whether an order number has been entered and a data set established via the scanning pencil 2. If this is not the case, appropriate means prevent the exposure unit 4 from operating and an error indication is produced. Furthermore, a request for entry of the order number is generated.

Once the order number has been properly entered, the film is automatically drawn into the exposure unit 4 where it is scanned and copied. The photographic copy paper which was exposed during this copying procedure is developed in the developing unit 5. The copy paper is then cut and sent to a sorter 6 which is designed to assemble the copies of the order.

Data pertaining to reproduction of the master in the exposure unit 4 and developing unit 5 is entered in the memory 10 and added to the data set previously established for the order. The added data may, for example, include the number of copies made.

The quality of each copy of the order is examined at a final inspection station 7. If one or more of the copies are unsalable, this must be taken into account when pricing the order. Thus, the data set established for the order in the pricing unit must be corrected.

The data set is stored in the memory 10 of the pricing unit in such a manner as to protect against unauthorized manipulation of the data. In order to reduce the possibility of unauthorized manipulation during the legitimate operation of correcting the data set for unsalable copies, the correction or corrections are carried out not by means of a keyboard but, instead, with a scanning pencil 8 located at the inspection station 7. To this end, the back of each copy may be marked, preferably in the form of a bar code, with all or part of the order number as well as the copy number. The scanning pencil 8 can then be moved over the back of a copy so as to read this data. Alternatively, a tray with different bar codes may be provided and the operator then picks out the bar code representing the appropriate price reduction from the available selection. In either case, the data set established for the order is properly adjusted or corrected.

Once the order has been checked in this manner, processing of the order can be terminated by the operator at the inspection station 7. The order may be placed in a bag or similar receptacle which is then put in a printer 9 where the price is printed on the bag. It is also possible for the printer 9 to print a label with the price and for the label to be applied to the bag.

The pricing unit may be designed to be switchable between an operative condition and an inoperative condition. Here, the pricing unit is in the operative condition while the order number is entered in the memory 10 via the scanning pencil 2 at the receiving station 1. The pricing unit may be deactivated after the exposure unit 4 begins operating in response to entry of the order number and may be reactivated once reproduction of the master has been completed. The number of copies produced while the pricing unit was inoperative may be entered in the memory 10 following reactivation.

It may occasionally be necessary to make test copies in the copying apparatus. In such an event, a special data set is established for the test copies in the memory 10 and identified appropriately.

Without further analysis, the foregoing will so fully reveal the gist of the present invention that others can, by applying current knowledge, readily adapt it for various applications without omitting features that, from the standpoint of prior art fairly constitute essential characteristics of the generic and specific aspects of the instant contribution to the art and, therefore, such adaptations should and are intended to be comprehended within the meaning and range of equivalence of the appended claims.

What is claimed is:

1. A copying method, particularly for use with photographic copying apparatus, comprising the steps of receiving a master together with an order for reproduction thereof; reading data characteristic of said order; processing said order only upon completion of the reading step, the processing step including reproduction of said master; and storing said characteristic data so as to inhibit unauthorized access thereto, said characteristic data establishing a data set.

2. The method of claim 1, wherein said order has an order number and said characteristic data includes said order number.

3. The method of claim 1, further comprising the step of incorporating additional data relating to said reproduction in said data set.

4. The method of claim 1, wherein the step of storing said characteristic data is performed at or near the beginning of the processing step.

5. The method of claim 4, further comprising the step of incorporating additional data relating to said reproduction in said data set, the step of incorporating said additional data being performed at or near the end of the processing step.

6. The method of claim 5, further comprising the steps of inspecting the copies made during said reproduction, and correcting said data set when at least one of said copies is unsalable.

7. The method of claim 6, further comprising the step of pricing said order.

8. The method of claim 5, wherein said additional data includes the number of copies made during said reproduction.

9. The method of claim 1, further comprising the steps of marking the copies made during said reproduction with at least part of said characteristic data, and inspecting said copies.

10. The method of claim 1, wherein said characteristic data is provided with said order in the form of a bar code and the reading step comprises scanning said bar code.

11. The method of claim 10, further comprising the steps of incorporating additional data relating to said reproduction in said data set, inspecting the copies made during said reproduction, and correcting said data set when at least one of said copies is unsalable, the correcting step including scanning a bar code.

12. The method of claim 1, further comprising the steps of making test copies, and establishing a data set for said test copies.

13. The method of claim 1, wherein the step of storing said characteristic data is performed prior to said reproduction and comprises entering said characteristic data in an activated pricing unit; and further comprising the steps of deactivating said pricing unit after the storing step and before said reproduction has been completed, reactivating said pricing unit subsequent to said reproduction, and incorporating additional data relating to said reproduction in said data set.

14. The method of claim 1, wherein said reproduction comprises exposing copy material to copy light from said master, and developing the exposed copy material.

15. A copying apparatus, particularly a photographic copying apparatus, comprising a station for receiving a master together with an order for reproduction thereof; means at said receiving station for reading data characteristic of the order; means for reproducing the master, said reproducing means being activated in response to said reading means; and means for storing the characteristic data so as to inhibit unauthorized access thereto.

16. The apparatus of claim 15, wherein said reproducing means comprises an exposure unit in combination with a developing unit.

17. The apparatus of claim 15, wherein said storing means constitutes part of a means for pricing the order.

18. The apparatus of claim 17, wherein said pricing means includes means for calculating the price of the order, and means for printing the price.

19. The apparatus of claim 15, wherein said reading means includes a bar code scanner.

20. The apparatus of claim 15, further comprising an inspection station for inspecting the copies from said reproducing means, and means at said inspection station for entering corrections in said storing means.

21. The apparatus of claim 20, wherein said entering means comprises a bar code scanner.

* * * * *